(12) United States Patent
Huynh et al.

(10) Patent No.: US 7,683,700 B2
(45) Date of Patent: Mar. 23, 2010

(54) TECHNIQUES OF RIPPLE REDUCTION FOR CHARGE PUMPS

(75) Inventors: Jonathan H. Huynh, San Jose, CA (US); Qui Vi Nguyen, San Jose, CA (US); Feng Pang, Fremont, CA (US)

(73) Assignee: SanDisk Corporation, Milpitas, CA (US)

( * ) Notice: Subject to any disclaimer, the term of this patent is extended or adjusted under 35 U.S.C. 154(b) by 10 days.

(21) Appl. No.: 12/146,243

(22) Filed: Jun. 25, 2008

(65) Prior Publication Data

US 2009/0322413 A1 Dec. 31, 2009

(51) Int. Cl.
G05F 1/10 (2006.01)
(52) U.S. Cl. ........................................ 327/536
(58) Field of Classification Search .................. 327/536, 327/537
See application file for complete search history.

(56) References Cited

U.S. PATENT DOCUMENTS

| | | |
|---|---|---|
| 3,697,860 A | 10/1972 | Baker |
| 4,511,811 A | 4/1985 | Gupta |
| 4,583,157 A | 4/1986 | Kirsch et al. |
| 4,636,748 A | 1/1987 | Latham |
| 4,736,121 A | 4/1988 | Cini et al. |
| 4,888,738 A | 12/1989 | Wong et al. |
| 5,263,000 A | 11/1993 | Van Buskirk et al. |
| 5,392,205 A | 2/1995 | Zavaleta |
| 5,436,587 A | 7/1995 | Cernea |
| 5,508,971 A | 4/1996 | Cernea et al. |
| 5,521,547 A | 5/1996 | Tsukada |
| 5,563,779 A | 10/1996 | Cave et al. |
| 5,563,825 A | 10/1996 | Cernea et al. |
| 5,568,424 A | 10/1996 | Cernea et al. |
| 5,592,420 A | 1/1997 | Cernea et al. |
| 5,596,532 A | 1/1997 | Cernea et al. |
| 5,621,685 A | 4/1997 | Cernea et al. |
| 5,625,544 A | 4/1997 | Kowshik et al. |
| 5,693,570 A | 12/1997 | Cernea et al. |
| 5,969,565 A | 10/1999 | Naganawa |
| 5,973,546 A | 10/1999 | Le et al. |
| 5,982,222 A * | 11/1999 | Kyung ........................ 327/536 |

(Continued)

FOREIGN PATENT DOCUMENTS

EP 0 382 929 A 8/1990

(Continued)

OTHER PUBLICATIONS

Feng Pan et al., "Charge Pump Circuit Design", McGraw-Hill, 2006, 26 pages.

(Continued)

*Primary Examiner*—Jeffrey S Zweizig
(74) *Attorney, Agent, or Firm*—Davis Wright Tremaine LLP

(57) ABSTRACT

A charge pump system for supplying an output voltage to a load is described. It includes a regulation circuit connected to receive the output voltage and derive an enable signal from it and multiple charge pump circuits connected in parallel to supply the output voltage. Each of the charge pump circuits is also connected to receive a clock signal and the enable signal. The system also includes one or more delay circuit elements, where a corresponding one or more, but less than all, of the charge pump circuits are connectable to receive the enable signal delayed by the corresponding delay circuit element.

10 Claims, 4 Drawing Sheets

U.S. PATENT DOCUMENTS

| | | | |
|---|---|---|---|
| 6,018,264 A | 1/2000 | Jin | |
| 6,023,187 A | 2/2000 | Camacho et al. | |
| 6,026,002 A | 2/2000 | Viehmann | |
| 6,134,145 A | 10/2000 | Wong | |
| 6,154,088 A | 11/2000 | Chevallier et al. | |
| 6,198,645 B1 | 3/2001 | Kotowski et al. | |
| 6,208,198 B1 * | 3/2001 | Lee | 327/536 |
| 6,249,898 B1 | 6/2001 | Koh et al. | |
| 6,285,622 B1 * | 9/2001 | Haraguchi et al. | 365/226 |
| 6,314,025 B1 | 11/2001 | Wong | |
| 6,329,869 B1 | 12/2001 | Matano | |
| 6,344,959 B1 | 2/2002 | Milazzo | |
| 6,344,984 B1 | 2/2002 | Miyazaki | |
| 6,370,075 B1 | 4/2002 | Haeberli et al. | |
| 6,404,274 B1 | 6/2002 | Hosono et al. | |
| 6,424,570 B1 | 7/2002 | Le et al. | |
| 6,445,243 B2 | 9/2002 | Myono | |
| 6,456,170 B1 | 9/2002 | Segawa et al. | |
| 6,486,728 B2 | 11/2002 | Kleveland | |
| 6,518,830 B2 | 2/2003 | Gariboldi et al. | |
| 6,525,949 B1 | 2/2003 | Johnson et al. | |
| 6,531,792 B2 | 3/2003 | Oshio | |
| 6,556,465 B2 | 4/2003 | Wong et al. | |
| 6,577,535 B2 | 6/2003 | Pasternak | |
| 6,606,267 B2 | 8/2003 | Wong | |
| 6,724,241 B1 | 4/2004 | Bedarida et al. | |
| 6,734,718 B1 | 5/2004 | Pan | |
| 6,760,262 B2 | 7/2004 | Haeberli et al. | |
| 6,798,274 B2 | 9/2004 | Tanimoto | |
| 6,834,001 B2 | 12/2004 | Myono | |
| 6,859,091 B1 | 2/2005 | Nicholson et al. | |
| 6,891,764 B2 | 5/2005 | Li | |
| 6,922,096 B2 | 7/2005 | Cernea | |
| 6,944,058 B2 | 9/2005 | Wong | |
| 6,975,135 B1 | 12/2005 | Bui | |
| 6,990,031 B2 | 1/2006 | Hashimoto et al. | |
| 7,023,260 B2 | 4/2006 | Thorp et al. | |
| 7,030,683 B2 | 4/2006 | Pan et al. | |
| 7,113,023 B2 | 9/2006 | Cernea | |
| 7,116,155 B2 | 10/2006 | Pan | |
| 7,120,051 B2 | 10/2006 | Gorobets | |
| 7,135,910 B2 | 11/2006 | Cernea | |
| 7,227,780 B2 | 6/2007 | Komori et al. | |
| 7,239,192 B2 | 7/2007 | Tailliet | |
| 7,276,960 B2 | 10/2007 | Peschke | |
| 7,397,677 B1 | 7/2008 | Collins et al. | |
| 2003/0128560 A1 | 7/2003 | Saiki et al. | |
| 2005/0248386 A1 | 11/2005 | Pan et al. | |
| 2006/0114053 A1 | 6/2006 | Sohara et al. | |
| 2007/0001745 A1 | 1/2007 | Yen | |
| 2007/0126494 A1 | 6/2007 | Pan | |
| 2007/0139099 A1 | 6/2007 | Pan | |
| 2007/0139100 A1 | 6/2007 | Pan | |
| 2007/0229149 A1 | 10/2007 | Pan et al. | |
| 2008/0024096 A1 | 1/2008 | Pan | |
| 2008/0157852 A1 | 7/2008 | Pan | |
| 2008/0157859 A1 | 7/2008 | Pan | |
| 2008/0239802 A1 | 10/2008 | Thorpe | |
| 2008/0239856 A1 | 10/2008 | Thorpe | |

FOREIGN PATENT DOCUMENTS

| | | |
|---|---|---|
| EP | 0 780 515 A | 6/1997 |
| WO | 01/06336 A1 | 1/2001 |
| WO | WO 2006/132757 | 12/2006 |

OTHER PUBLICATIONS

Ang et al., "An On-Chip Voltage Regulator Using Switched Decoupling Capacitors," 2000 IEEE International Solid-State Circuits Conference, 2 pages.

Louie Pylarinos et al., "Charge Pumps: An Overview", Department of Electrical and Computer Engineering University of Toronto, Canada, 2001, [online], available: http://www.eecg.toronto.edu/kphang/ece1371/chargepumps.pdf, 7 pages.

* cited by examiner

TECHNIQUES OF RIPPLE REDUCTION FOR CHARGE PUMPS

FIELD OF THE INVENTION

This invention pertains generally to the field of charge pumps and more particularly to ripple reduction in charge pumps.

BACKGROUND

Charge pumps use a switching process to provide a DC output voltage larger than its DC input voltage. In general, a charge pump will have a capacitor coupled to switches between an input and an output. During one clock half cycle, the charging half cycle, the capacitor couples in parallel to the input so as to charge up to the input voltage. During a second clock half cycle, the transfer half cycle, the charged capacitor couples in series with the input voltage so as to provide an output voltage twice the level of the input voltage. This process is illustrated in FIGS. 1a and 1b. In FIG. 1a, the capacitor 5 is arranged in parallel with the input voltage $V_{IN}$ to illustrate the charging half cycle. In FIG. 1b, the charged capacitor 5 is arranged in series with the input voltage to illustrate the transfer half cycle. As seen in FIG. 1b, the positive terminal of the charged capacitor 5 will thus be $2*V_{IN}$ with respect to ground.

Charge pumps are used in many contexts. For example, they are used as peripheral circuits on EEPROM, flash EEPROM and other non-volatile memories to generate many of the needed operating voltages, such as programming or erase voltages, from a lower power supply voltage. A number of charge pump designs, such as conventional Dickson-type pumps, are know in the art. But given the common reliance upon charge pumps, there is an on going need for improvements in pump design, particularly with respect to trying to reduce the amount of layout area and the current consumption requirements of pumps.

FIG. 2 is a top-level block diagram of a typical charge pump arrangement. The designs described here differ from the prior art in details of how the pump section 201. As shown in FIG. 2, the pump 201 has as inputs a clock signal and a voltage Vreg and provides an output Vout. The high (Vdd) and low (ground) connections are not explicitly shown. The voltage Vreg is provided by the regulator 203, which has as inputs a reference voltage Vref from an external voltage source and the output voltage Vout. The regulator block 203 regulates the value of Vreg such that the desired value of Vout can be obtained. The pump section 201 will typically have cross-coupled elements, such at described below for the exemplary embodiments. (A charge pump is typically taken to refer to both the pump portion 201 and the regulator 203, when a regulator is included, although in some usages "charge pump" refers to just the pump section 201.)

FIG. 3 illustrates schematically a charge pump typical of the prior art. The charge pump receives an input at a voltage $V_{in}$ and provides an output at a higher voltage $V_{out}$ by boosting the input voltage progressively in a series of voltage multiplier stages. The voltage output is supplied to a load, for example the word line of an EPROM memory circuit. FIG. 3 also shows a feedback signal from the load to the charge pump, but without explicitly showing the regulator block. Most charge pump arrangements will typically have two such branches of one of more stage that alternately provided Vout as the clock signals alternate.

FIG. 4 schematically illustrates a voltage multiplier stage as commonly implemented in the prior art. The stage pumps charge in response to a clock signal shown as "CLK." When the clock signal is at a low portion of the clock cycle (e.g. 0V) the driver circuit output is LOW. This means that the lower terminal of capacitor C is at 0 volts. An input supplies a voltage $V_{n-1}$ through the diode D (typically a diode connected transistor) and provides approximately $V_{n-1}$ to the upper terminal of C (ignoring the voltage drop across the diode, D). This will deposit a charge Q on the capacitor, where $Q=CV_{n-1}$. When the clock signal transitions to a high state the output of the driver circuit is high, for example $V_{CLK}$ and so the lower terminal of C is at $V_{CLK}$. This will force the upper terminal of C to be $(V_{n-1}+\Delta V_{CLK})$ since charge, Q, is conserved and C is constant. Thus the output voltage of the voltage multiplier stage is: $V_n = V_{n-1} + \Delta V_{CLK}$. The driver will drive one side of the capacitor to Vclk, however because of parasitic capacitance the other side will be increased by $\Delta V_{CLK}$, a voltage less than $V_{CLK}$.

FIG. 5 illustrates the regulated output voltage of a typical charge pump of the prior art while maintaining a voltage, for example the programming voltage of a flash memory $V_{pp}$. When the output voltage falls below a margin of $V_{pp}$, the pump is turned on by the regulator. The pump delivers a high current to the load and drives the voltage higher than $V_{pp}$. The pump then switches off in response to a feedback signal from the load. The voltage on the load then drops due to leakage current until it reaches a predetermined voltage, lower than $V_{pp}$ by a fixed amount. Then the charge pump switches on again. This cycle produces the ripples in voltage shown. If these ripples (shown by $\Delta V$) are large they may cause problems; for the $V_{pp}$ example, this can be manifested by problems such as by programming a floating gate to the wrong voltage level, or by causing a greater variation in program levels.

Because such voltage ripples may cause errors in the applications to which the charge pump is applied, it is important for its regulated output to be steady. Prior art charge pumps generally give an output with significant ripples, so that there is a need for a charge pump with ripple reduction capability.

SUMMARY OF THE INVENTION

A charge pump system for supplying an output voltage to a load is described. It includes a regulation circuit connected to receive the output voltage and derive an enable signal from it and multiple charge pump circuits connected in parallel to supply the output voltage. Each of the charge pump circuits is also connected to receive a clock signal and the enable signal. The system also includes one or more delay circuit elements, where a corresponding one or more, but less than all, of the charge pump circuits are connectable to receive the enable signal delayed by the corresponding delay circuit element.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

The various aspects and features of the present invention may be better understood by examining the following figures, in which.

DETAILED DESCRIPTION

To be adaptable to multiple purposes (loads and voltages), one relatively large charge pump is divided up into several smaller charge pumps connected in parallel to provide their individual outputs together as a combined output. To reduce the amount of ripple at the output during regulation, the multiple pumps are not all immediately enabled, but some are delayed and only enabled if the initial output is insufficient to drive the load at the regulation level.

More information on charge pumps, such Dickson type pumps and charge pumps generally, can be found, for example, in "Charge Pump Circuit Design" by Pan and Samaddar, McGraw-Hill, 2006, or "Charge Pumps: An Overview", Pylarinos and Rogers, Department of Electrical and Computer Engineering University of Toronto, available on the webpage "www.eecg.toronto.edu/~kphang/ece1371/chargepumps.pdf". Further information on various other charge pump aspects and designs can be found in U.S. Pat. Nos. 5,436,587; 6,370,075; 6,556,465; 6,760,262; 6,922,096; and 7,135,910; and application Ser. Nos. 10/842,910 filed on May 10, 2004; 11/295,906 filed on Dec. 6, 2005; 11/303,387 filed on Dec. 16, 2005; 11/497,465 filed on Jul. 31, 2006; 11/523,875 filed on Sep. 19, 2006; 11/845,903 and 11/845,939, both filed Aug. 28, 2007; 11/955,221 and 11/995, 237, both filed on Dec. 12, 2007; 12/135,945 filed on Jun. 9, 2008; and 12/144,808, filed Jun. 24, 2008. In particular, U.S. Pat. No. 6,734,718 presents complementary ripple reduction techniques.

Figure 1A:
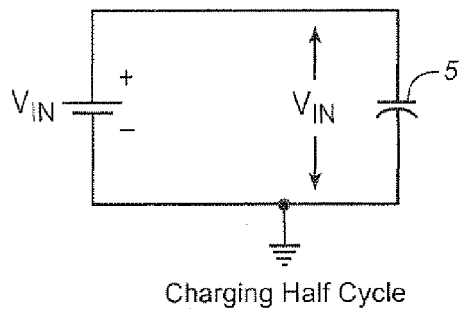
FIG. 1a is a simplified circuit diagram of the charging half cycle in a generic charge pump.
Figure 1B:
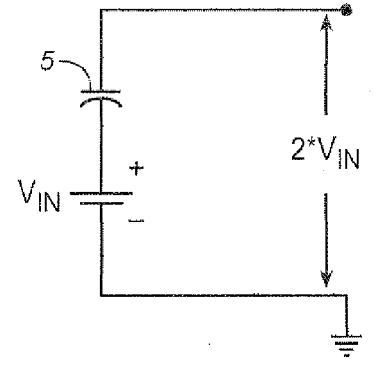
FIG. 1b is a simplified circuit diagram of the transfer half cycle in a generic charge pump.
Figure 2:
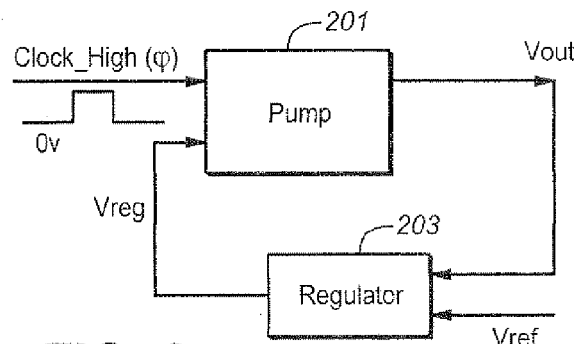
FIG. 2 is a top-level block diagram for a regulated charge pump.
Figure 3:
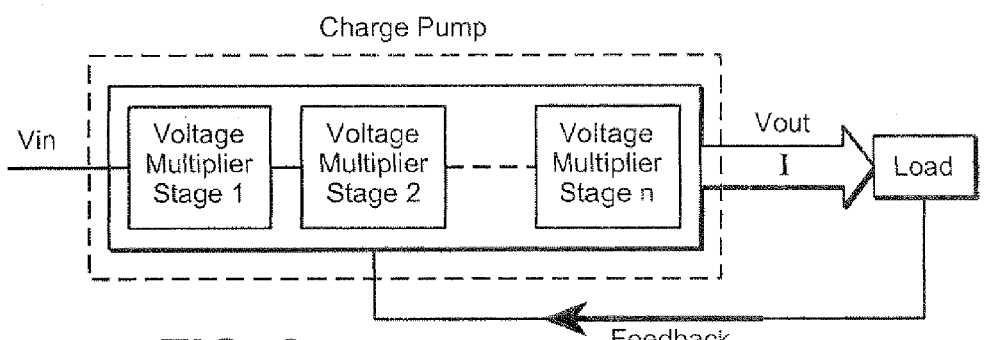
FIG. 3 illustrates a charge pump of the prior art.
Figure 4:
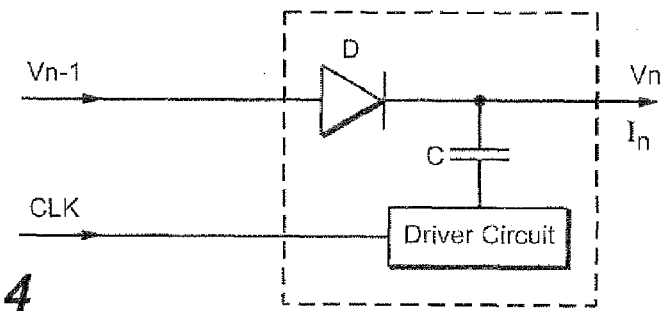
FIG. 4 illustrates a voltage multiplier stage of the prior art.
Figure 5:
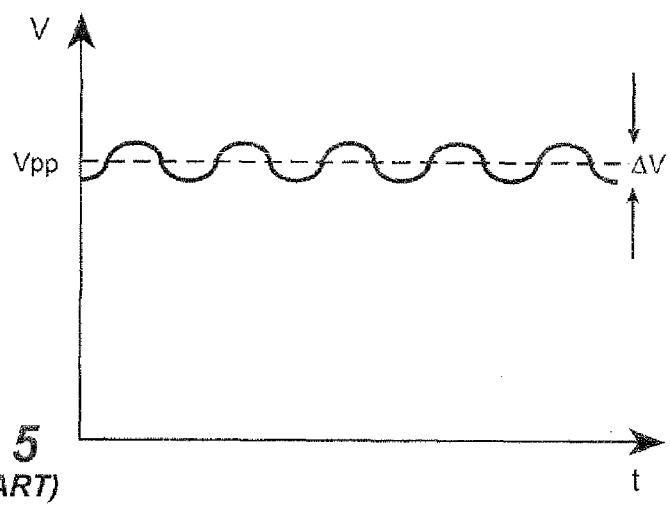
FIG. 5 illustrates the voltage output of a typical charge pump of the prior art.
Figure 6:
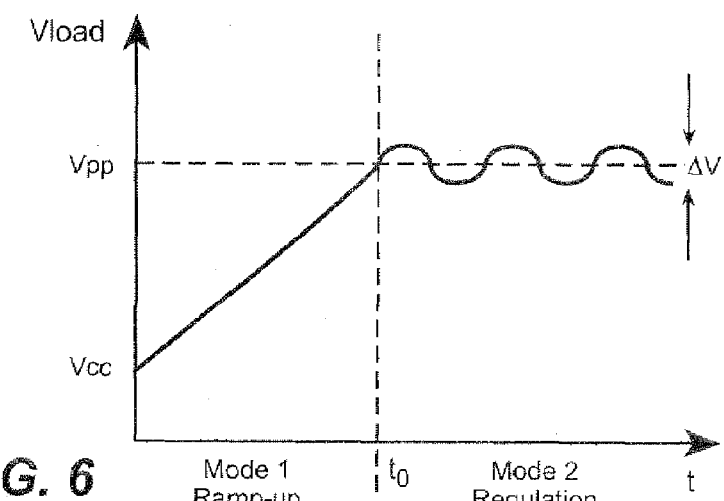
FIG. 6 illustrates the voltage output of a pump in the recovery and regulation modes.

Charge pumps often operate in two modes, ramp-up or recovery mode and regulation mode. FIG. 6 illustrates the voltage on the load in these two modes of operation. Mode 1 is the ramp-up or recovery mode during which the load is brought to a predetermined voltage. (The Mode 2 region is similar to FIG. 5.) This requires a large current to charge the load to the required voltage as rapidly as possible. The figure shows an example of charging up a load (e.g. a wordline) from $V_{cc}$ to $V_{pp}$ in a time $t_0$. Mode 2 is the regulation mode during which the voltage is held as closely as possible to the required voltage, $V_{pp}$. That is, $\Delta V$ in FIG. 6 is made as small as possible. (This requires a smaller current because a large current deposits a large quantum of charge each time the pump is turned on.

Figure 7:
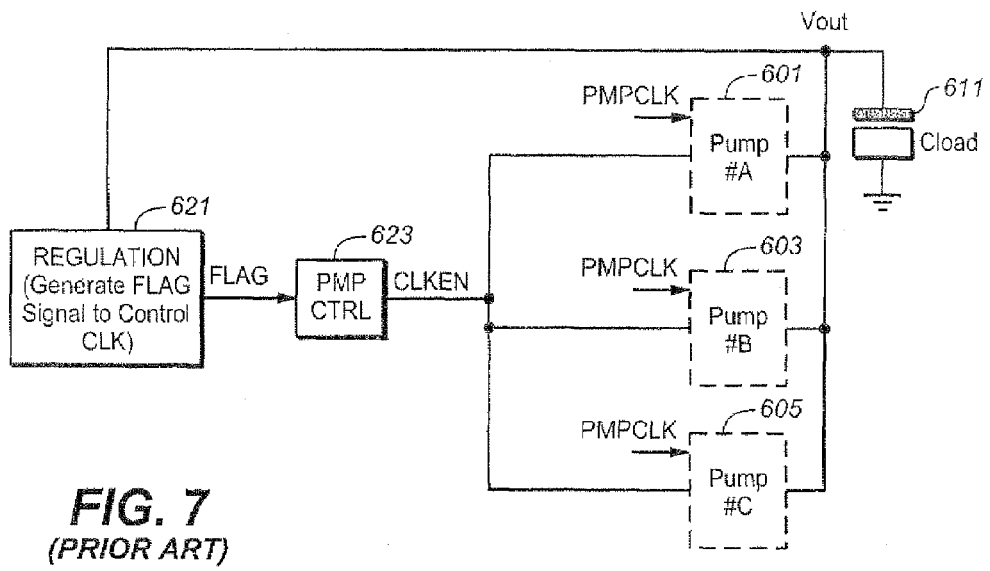
FIG. 7 is a box diagram of a charge pump system having three pumps.

FIG. 7 is a box diagram of a charge pump system having three pumps, Pump A 601, Pump B 603, and Pump C 605 each receiving the clock signal PMPCLK and that are connected in parallel to drive the, in this example, capacitive load Cload 611. The output level is also fed back to the regulation element 621, which generates a flag telling the pump control circuit 623 provide the clock enable signal CLKEN to the pumps when these are to be turned on. The use of three pumps allows the output to be adapted to the load.

Figure 8:
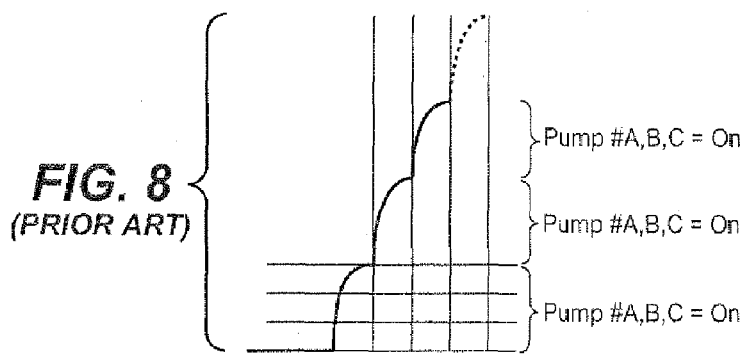
FIG. 8 shows the cumulative charge pumped by the arrangement of FIG. 7 when enabled.

In this example, the three pumps are connected in parallel and enabled by the same CLKEN signal to deliver charge to the output. Since they are controlled simultaneously by the signal CLKEN, when this signal is asserted all three will drive the load, which can lead to a potential overshoot and resultant high ripple level. The resultant waveform in such open regulation is shown in FIG. 8, which shows the cumulative charge sent to the node marked Vout on FIG. 7. In regulation mode starting when the pumps are enabled (CLKEN asserted), in each cycle (indicated by the vertical dotted line) the amount of charge bracketed at right is supplied to the output node. The horizontal dotted line show the amount each pump contributes in the first cycle, which in this example are taken to be equal.

Figure 9:
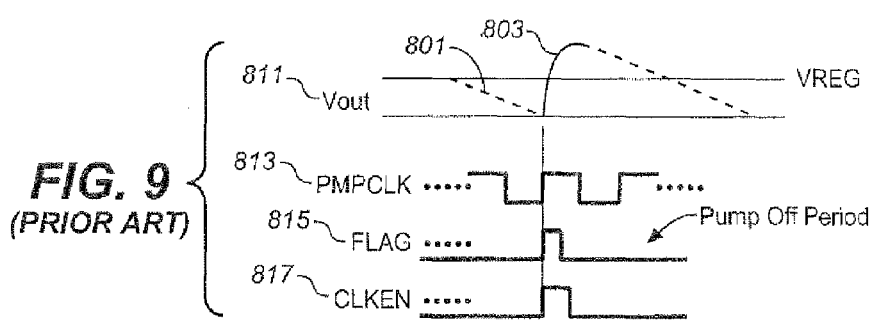
FIG. 9 illustrates some of the various signals involved when the pump system of FIG. 7 is in regulation.

FIG. 9 illustrates an example of some of the various signals involved in regulation and corresponding Vout value. The specific waveforms shown are Vout 811, PMPCLK 813, FLAG 815, and CLKEN 817. For the Vout waveform 811, the lower line shows the voltage which will trigger the pumps coming back on and the upper line is where the pump will be disabled, as the voltage has passed the desired level. The waveforms begin with the Vout voltage on the load decreasing as shown in 801, decreasing until it reaches the lower level. This will cause the regulation element 621 to assert FLAG 815, with the pump control 623 in turn asserting CLKEN 814. Here, these are all shown to coincide with a rising edge of the PMPCLK single 813. Once the pumps are enabled, the supply charge to the output node. As shown in FIG. 8 at 803, during regulation, within one clock edge, they may be capable of delivering more than required charge to keep in regulation. As the single cycle causes the upper Vreg value to be exceeded, the pump are disabled, the level are Vout drops off and the process is repeated. Consequently, a high degree of ripple can result.

Figure 10:
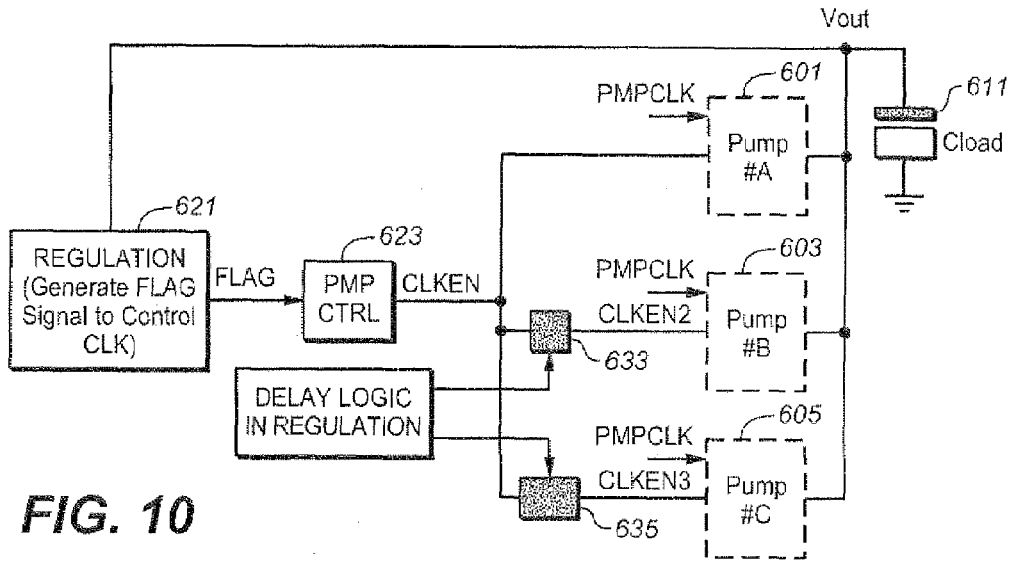
FIG. 10 is a box diagram for an exemplary embodiment of a multiple charge pump system with delay enable.

FIG. 10 presents an exemplary embodiment to illustrate some of the aspects presented here. As shown there, with the exception of elements 633 and 635, equivalents elements are arranged in the same way. The exemplary embodiment again shows three charge pumps (#A 601, #B 603, #C 605), but more generally the concept can be applied to any multiple number of pumps, whether 2, 3, or more. The charge pumps themselves can be of any of the various designs, such as those presented in the various references noted above, and not all of the pumps in the system need be of the same design. Here they are taken to of the same type, to have the same output, and to have same PMPCLK signal received in phase, but more generally any of these could be different.

To reduce the amount of ripple with respect to FIG. 7, a delay logic is enabled during regulation. This is implemented by the delay elements 633 and 635. As shown in FIG. 10, Pump #A 601 is controlled by the original CLKEN signal; Pump #B 603 is controlled by some delay time from CLKEN signal due to delay element 633; and Pump #C 605 is controlled through 635 by some longer delay time than B (illustrated schematically by the larger size of 635) from CLKEN signal. Depending on the embodiment and configuration, the amount of relative delay between the various delayed stages (here two, #B and #C) can be taken the same or different and can be preset, user configurable, or even dynamically adaptable. For the example here, 633 will have a delay of two cycles and 635 will have a delay of two cycles.

The idea is that in order to raise the output voltage from the level which will trip the regulation into enabling the charge up to the desired regulated voltage, the use of all three pumps may be too much, as has been described with respect to FIGS. 7-9. Instead, the embodiment of FIG. 10 initially only invokes one of the pumps, reducing the potential for overshoot; should this not be enough, a second pump will start, followed, if needed, by the third. This provides a more incremental approach to the desired level during the regulation mode.

Figure 11:
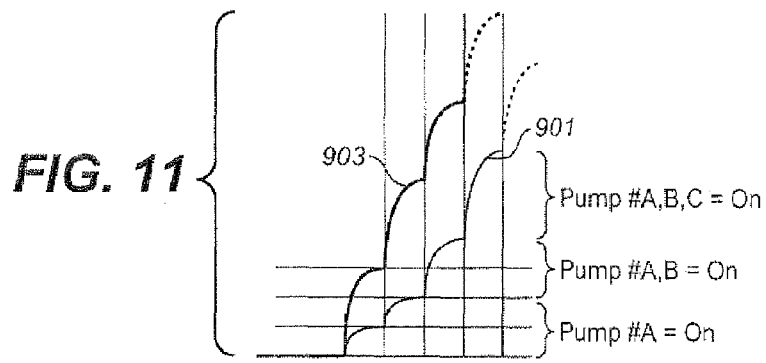
FIG. 11 shows the cumulative charge pumped by the arrangement of FIG. 10 when enabled.

FIG. 11 shows an example of the cumulative charge pumped to the output node under this arrangement during open regulation at 901. The waveform from FIG. 8 is also superimposed at 903 for comparison. In the first two clock pulses (separated by the vertical lines) after the pump the enable signal is asserted, only pump #A 601 is enable, supplying the quantity of charge indicated by the horizontal lines. If this is not sufficient to bring the output up to the regulation level, pump #B 603 is enabled, with pump #C 605 following in the next cycle. Thus, if needed, all three pumps will eventually be enabled to drive the load.

Figure 12:
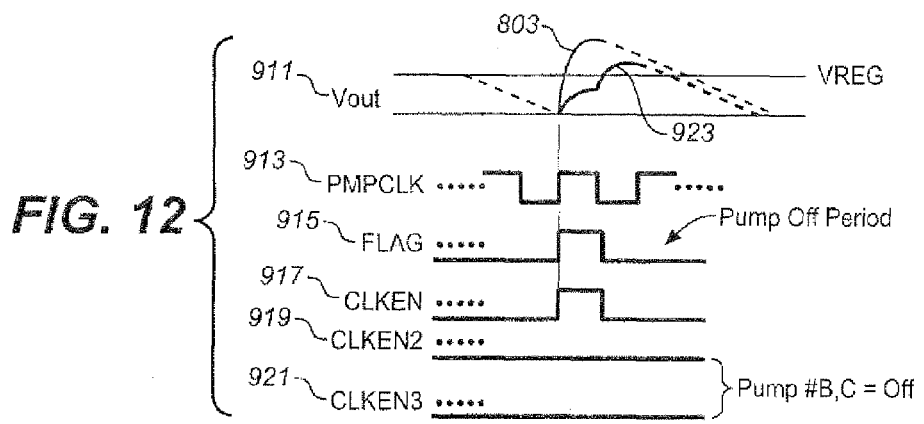
FIG. 12 illustrates some of the various signals involved when the pump system of FIG. 10 is in regulation.

In term of regulation, this is as shown in FIG. 12. The waveforms 913, 915, and 917 are much the same as their counterparts in FIG. 9; however, the CLKEN is now only supplied to Pump #A 601. During the first two clock pulse, only the one pump is enabled and the other two are off the exemplary embodiment. Consequently, the CLKEN2 919 and CLKEN 3 921 are not asserted. As shown at top in 911, since these two cycles are enough to bring the output voltage 923 up to the regulation value in the example, the other pair of pumps will not be needed for the load being driven. This example shows that something like a third of the original ripple (superimposed at 803) is reduced.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

It is claimed:

1. A charge pump system for supplying an output voltage to a load, comprising:
   a regulation circuit connected to receive the output voltage and derive an enable signal therefrom;
   a plurality of charge pump circuits connected in parallel to supply the output voltage, each of the charge pump circuits further connected to receive a clock signal and the enable signal; and
   one or more delay circuit elements, where a corresponding one or more, but less than all, of the charge pump circuits are connectable to receive the enable signal delayed by the corresponding delay circuit element.

2. The charge pump system of claim 1, wherein all of the charge pump circuits are similarly constructed.

3. The charge pump system of claim 1, wherein a first of the charge pump circuits receives a non-delayed version of the enable signal and remaining ones of said plurality of charge pump circuits receive a delayed version of the enable signal, each of the delayed versions being delayed by the corresponding delay circuit element by a differing amount.

4. The charge pump system of claim 1, wherein the charge pump system operates in a regulation mode and in a recovery mode, said delay circuit elements delaying the enable signals only in the regulation mode.

5. The charge pump system of claim 1, wherein said load includes cells of a non-volatile memory.

6. A method of supplying an output voltage to a load, comprising:
   providing a plurality of charge pump circuits connected in parallel to supply the output voltage;
   receiving at each of the charge pump circuits a clock signal;
   receiving the output voltage at a regulation circuit;
   deriving at the regulation circuit an enable signal from the output voltage;
   providing the enable signal to each of the charge pump circuits; and
   delaying the enable signal provided to one or more, but less than all, of the charge pump circuits.

7. The method of claim 6, wherein all of the charge pump circuits are similarly constructed.

8. The method of claim 6, wherein the plurality of charge pump circuits includes three or more charge pump circuits,
   wherein providing the enable signal to each of the charge pump circuits includes receiving a non-delayed version of the enable signal at a first of the charge pump circuits, and
   wherein delaying the enable signal includes delaying each of the delayed enable signals by a differing amount.

9. The method of claim 6, wherein the charge pump system operates in a regulation mode and in a recovery mode, said delay circuit elements delaying the enable signals only in the regulation mode.

10. The method of claim 6, wherein said load includes cells of a non-volatile memory.

* * * * *